June 11. 1963  H. W. JOHANNSEN ETAL  3,093,029
SLIDE PROJECTOR WITH REMOTELY CONTROLLED
OBJECTIVE FOCUSING MEANS
Filed May 16, 1961  2 Sheets-Sheet 1

INVENTORS
HANS WERNER JOHANNSEN
&
GERHARD BAST

BY *Blum, Moscovitz,*
*Friedman & Blum*
Attorneys

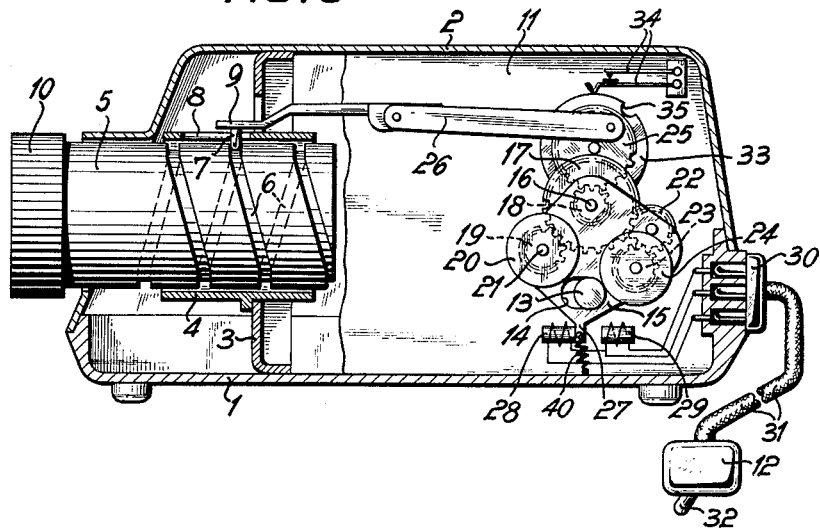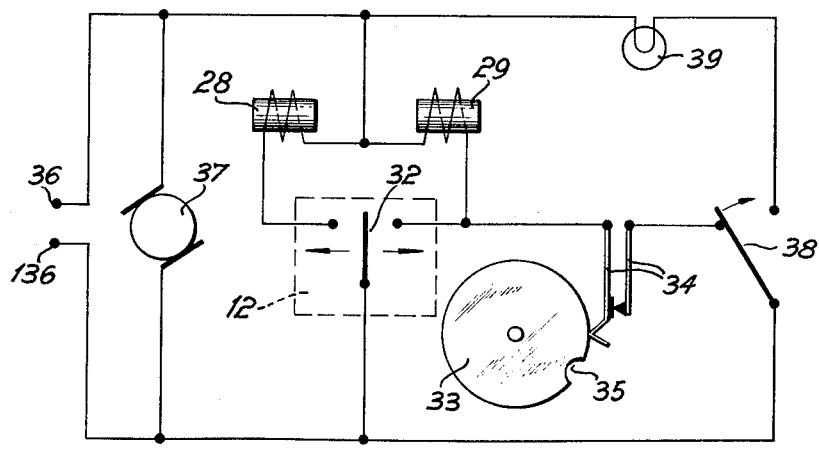

United States Patent Office 3,093,029
Patented June 11, 1963

3,093,029
SLIDE PROJECTOR WITH REMOTELY CONTROLLED OBJECTIVE FOCUSING MEANS
Hans Werner Johannsen and Gerhard Bast, both of Braunschweig, Germany, assignors to Voigtlander A.G., Braunschweig, Germany, a corporation of Germany
Filed May 16, 1961, Ser. No. 110,451
Claims priority, application Germany May 25, 1960
9 Claims. (Cl. 88—24)

This invention relates to slide projectors with remotely controlled objective setting or focusing means operable to shift the objective axially in either direction, and more particularly to an improved objective focusing arrangement of this type.

When a set series of slides which are not mounted in identical frames are projected, the objective of the slides projector, which initially may have been properly focused manually, may have to be re-set for individual slides. For this purpose, arrangements have been provided including a remote control switch connected to the slide projector by a cable and arranged to operate a setting device which will shift the objective axially in either direction from its first setting to obtain proper focusing of a particular slide. As a general rule, the power for shifting of the objective is derived from the electric motor driving the blower which is usually built into the projector for cooling of the projection lamp.

Such setting devices are effective to operate the objective over only a limited range between axially spaced limiting positions. Where the objective, when such remote control setting device is actuated, happens to be at or much nearer to one limit than the other of its limited range of movement by the setting device, the objective can be moved axially only in a direction away from such one limit, or will have only a very small movement toward such one limit. If the objective cannot bring the particular slide into proper focus within the thus limited range of movement, the remote setting device will not be effective to properly adjust the objective to bring the particular slide into proper focus. Thus, it is necessary in such a case to adjust the objective manually.

In accordance with the present invention, the foregoing difficulty is avoided by providing an objective setting device including mechanism for automatically positioning the setting device so that its point of coupling to the objective or its mount is substantially at the midpoint of the range of adjustment, provided by the setting means, responsive to placing the projector in condition for projecting slides.

The objective setting device could be made manually adjustable for initial setting of its point of coupling to the objective at the center or midpoint of the range of movement. In such a case, the setting device would have to be adjusted before the objective is manually focused for projection of the first slide of the series. However, since such manual focusing might inadvertently be omitted, it is preferably that the means or mechanism for adjusting the setting device so that its objective coupling point is at the center of the range of adjustment be made to operate automatically when the projector is made operative, and to be provided with means for terminating the automatic adjustment when the coupling point of the setting device to the objective has attained the center of its range of movement. For example, the mechanism for so initially adjusting the setting device could be activated responsive to connection of the projector to a source of power, responsive to switching on the projecting lamp, responsive to insertion of a slide magazine into the projector, or responsive to movement of the first slide into the position for projection on a screen. However, it has been found preferable that the setting device be adjusted automatically to move its objective coupling point to the center of its range of movement even before the objective is manually focused for projection of the first slide.

Where the setting device pre-adjusting mechanism embodying the invention includes an operator whose position is controlled by the remotely controlled setting device, and where this operator controls switch means for activating and deactivating the setting device, it is advantageous that the switch means be arranged to activate the setting device adjusting mechanism whenever the objective coupling point of the setting device is not at the center of its range of movement, and to deactivate the setting device adjusting mechanism once the objective coupling point of the setting device has attained the center of its range of movement. In such case, the switch means is included in a circuit which is energized when the projector is connected to a source of potential, but which is de-energized when the projector is in operation.

For an understanding of the principles of the invention, reference is made to the following description of a typical embodiment thereof as illustrated in the accompanying drawings. In the drawings:

FIG. 3 is a view similar to FIG. 1 but showing the objective coupling point near the other limit of its range of movement; and FIG. 4 is a schematic wiring diagram of a preferred control circuit embodying the invention.

Figure 1:
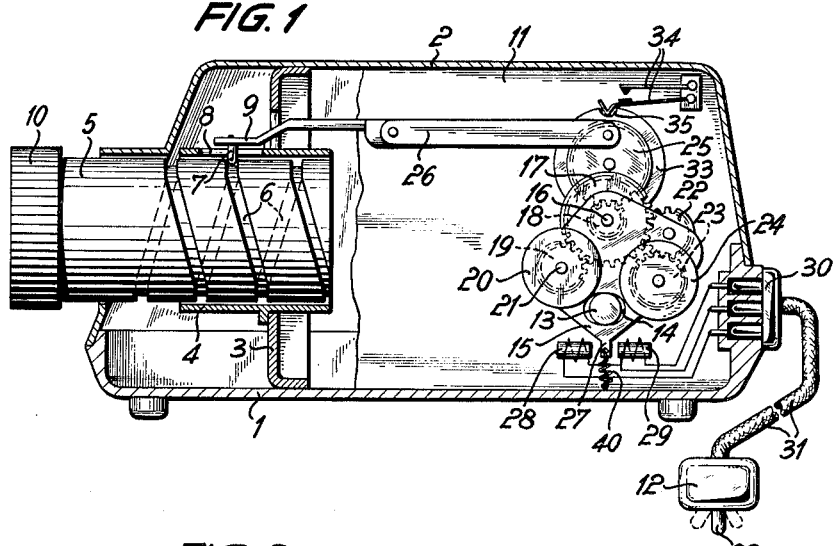
FIG. 1 is a longitudinal and vertical sectional view through a slide projector embodying the invention, showing the setting means for the objective at substantially the center of the range of movement of its objective coupling point.
Figure 2:
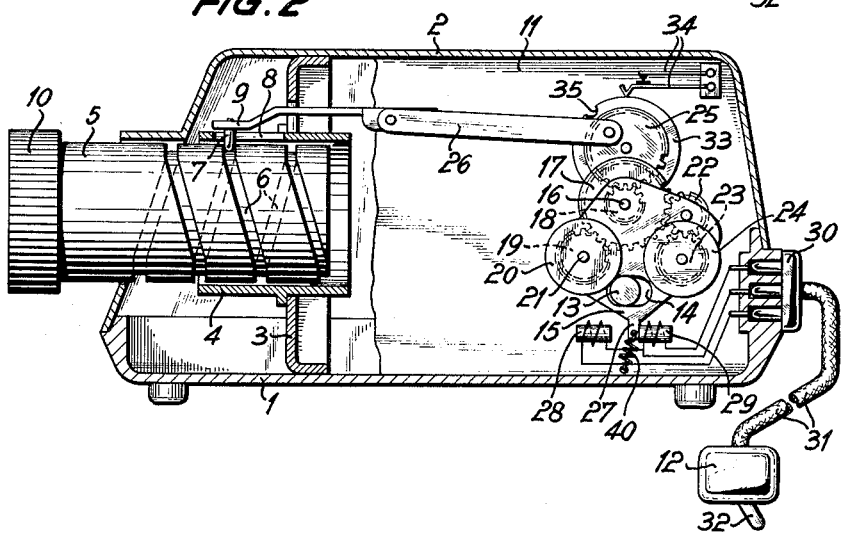
FIG. 2 is a view similar to FIG. 1 but illustrating the objective coupling point near one limit of its range of movement.

Referring to FIGS. 1, 2, and 3, a slide projector embodying the invention is illustrated as including a housing 1, a removable cover 2, and an intermediate partition or wall 3. Wall 3 has an opening therethrough in which is mounted a control sleeve 4 embracing objective mount 5, the mount 5 being movable axially through the control sleeve 4. Mount 5 has a helical groove 6 in its cylindrical outer surface, in which is engaged a bolt, pin, or follower 7 extending through an axially elongated slot 8 in the sleeve 4. Bolt or follower 7 is secured to an adjusting slide 9.

The objective may be manually focused by turning the knurled ring 10. With the follower 7 engaging in the groove 6, such rotation of the objective mount will result in axial movement of the mount so that the objective may be properly focused manually.

A remotely controled objective setting or focusing device is mounted on a side wall 11 of the projector, and is controlled by a remote control switch 12. This arrangement makes it possible to correct the initial setting of the objective from a remote position, which correction is necessary, for example, when the slides in a series are not set in identical frames but set into frames of varying thicknesses. For example, the series may include some slides set into glass frames and other slides set into cardboard frames. In a known manner, the remotely controlled objective setting device is selectively operated by a motor built into the projector, such as the motor driving the blower for cooling the projection lamp.

As shown in FIGS. 1, 2, and 3, the motor has a shaft 13 extending through an elongated opening 14 in a drive or wobbler plate 15 which is pivotally suspended on a pin pivot 16 mounted on the side wall 11 of the projector and spaced from shaft 13. A weak tension spring 40 is connected between the free end of plate 15 and the housing 1, and biases plate 15 to the position shown in FIG. 1. Pin 16 serves also to rotatably support gears 17 and 18 which are coupled together for conjoint rotation.

Gear 17 meshes with a pinion 19 which is conjointly rotatable with a friction wheel 20, the gear 19 and the friction wheel 20, the gear 19 and the friction wheel 20 being rotatable on a shaft or bearing 21 secured to plate 15. Gear 17 also meshes with a pinion 22 which is engaged with a pinion 23 secured, for conjoint rotation therewith, to another friction wheel 24. The gear 18 meshes with a gear 25 rotatably mounted on side wall 11. A connecting rod 26 has one end secured eccentrically to gear 25, and its other end connected to the adjusting slide 9.

An armature 27, forming an extension of plate 15 and to which the spring 40 is secured, is disposed between two electromagnets 28 and 29. The energizing windings for electromagnets 28 and 29 are connected to remote control switch 12 by means of connector element 30 and cable 31. Electromagnets 28 and 29 can be selectively energized or de-energized by operation of a lever 32 of switch 12. In the neutral position of lever 32, both electromagnets are de-energized, and in either operated position thereof, one or the other of the electromagnets 28 or 29 is energized.

When either electromagnet 28 or 29 is energized, the armature 27 is drawn thereto, as shown in FIG. 2 or in FIG. 3. Thereby, either the friction wheel 20 (FIG. 2) or the friction wheel 24 (FIG. 3) is frictionally engaged with the rotating shaft 13 of the blower motor. As the friction wheel 20 or 24 is thus rotated, its rotation is imparted to the gear 25. The rotation of gear 25, through connecting rod 26, adjusting slide 9, and follower 7, causes the objective mount 5 to be shifted axially of the control sleeve 4. This movement serves to change the focusing of the objective, if re-focusing is required during projection of a series of slides.

The effective stroke of connecting rod 26 must be sufficient to shift the objective mount axially the required distance for proper focusing. On the other hand, however, the stroke of the connecting rod 26 cannot be of such a magnitude as to cause axial shifting of the objective mount into an area where the focusing is extremely indistinct. If, by proper dimensioning of the structural parts, a stroke of the proper length is obtained, and assuming that the stroke does not have an excessive length, it may, in some instances, be insufficient for proper focusing of the objective lens during the operation of the projector. Such instances can occur, for example, when connecting rod 26, prior to a re-setting operation, is at or near either limit of its stroke, and when the objective lens is manually focused by means of turning knurled ring 10 while the objective is in this position. Should it be necessary to adjust the focusing thereafter, the connecting rod 26 will not be effective, through the slide 9 and follower 7, to move the objective mount equidistant axially in either direction from its initial position. The connecting rod 26, would, in such case, be able to move the objective mount only in one direction, or predominantly only in one direction, from its initial position. If the objective cannot be properly focused during such unidirection travel of the objective mount, proper re-focusing by use of the remote control switch 12 cannot be attained, and the objective would have to be manually re-focused by turning the knurled ring 10.

To obviate this disadvantageous and objectionable circumstance, the present invention provides means which will automatically shift the remotely controlled setting device to a position in which follower 7 is intermediate the limits of its stroke, responsive to placing of the projector in operation. Thus, and after the objective has been manually focused before the start of projection of the slides, it is possible to re-focus the objective lens by remote control by shifting it axially in either direction to the required extent.

Referring again to FIGS. 1, 2, and 3, a cam disk 33 is provided which is coaxial with the gear 25 and conjointly rotatable therewith. A normally open switch 34 is mounted upon the side wall 11 and has one arm resiliently biased to continuously engage the periphery of disk 33, the switch 34 being closed when this lower arm is in engagement with the major part of the periphery of cam 33 but being open when the follower end of the lower switch arm engages in a recess or notch 35 in the periphery of the cam disk 33. The switch 34 is connected in energizing relation with one of the electromagnets 28 or 29 so that, when a potential is applied to the energizing circuit and when the switch 34 is closed, this particular electromagnet 28 or 29 is energized to effect operation of the setting mechanism until such time as the energizing circuit is broken when switch 34 opens by virtue of the free end of its lower arm dropping into the cam recess 35. The cam disk 33 is so oriented, relative to the connecting rod 26, that the remote control setting device occupies a position substantially midway between its limits of motion whenever the free end of the lower arm of switch 34 engages in the recess 35.

The schematic wiring diagram of FIG. 4 illustrates the electrical features of the present invention. The projector is connected to a potential supply at the terminals 36 and 136 and, when so connected, the blower motor 37 is energized. The projection lamp 39 is controlled by a switch 38, which, in FIG. 4, is illustrated in the "lamp-off" position in which it connects the switch 34 to the terminal 136. When switch 34 is closed, as shown in FIG. 4, current will flow from terminal 136 through switch 38, switch 34, and electromagnet 29 to the terminal 36. The electromagnet 29 is thus energized so that the remote control setting device is operable to shift the objective mount. As the remote control setting device is operated, the cam disk 33 will rotate until such time as the free end of the lower arm of switch 34 drops into the cam recess 35 to open the switch 34. This will de-energize the electromagnet 29 so that the remote control setting device is no longer operating. The setting device now reassumes the position of FIG. 1 whereas, before its stopping, it has the position of FIG. 2.

Switch 38 is then closed to its other position from the position shown in FIG. 4, to energize the projection lamp 39, cutting the switch 34 out of the energizing circuit. The first slide can then be moved across the optical axis of the projector, and the image can be brought into proper focus by manual adjustment of the objective mount through turning the knob 10. Any subsequent re-focusing necessary during the showing of the series of slides, can be effected by using the switch lever 32 of the remote control switch 12. The important fact is that the setting device objective coupling point is initially at the midpoint of its range of movement so that the objective mount may be moved in either direction during such re-focusing, and has the maximum possible movement in either direction.

While a specific embodiment of the invention has been shown and described in detail to illustrate the application of the principles of the invention, it will be understood that the invention may be embodied otherwise without departing from such principles.

What is claimed is:

1. A slide projector including a manually settable objective mount; a projection lamp; a setting device, including a coupling member coupled to the objective mount, operable to adjust the mount longitudinally of the objective axis to focus the objective, the coupling member being operable through a limited range in opposed directions longitudinally of the objective axis; driving means for the setting device; electrically operated remotely controlled means selectively operable to couple the driving means and the setting device to operate the setting device in a selected direction within such range; a switch in circuit with said remotely controlled means; a switch operating element, movable in accordance with the position of said coupling member by said setting device, and operatively associated with said switch; said element effecting closure of said switch whenever said coupling member is at other than substantially the midpoint of such range, and effecting opening of said switch when said coupling member is at such midpoint; and means operable, responsive to activation of the projector, to connect said switch to a source of potential.

2. A slide projector including a manually settable objective mount; a projection lamp; a setting device, including a coupling member coupled to the objective mount, operable to adjust the mount longitudinally of the objective axis to focus the objective, the coupling member being operable through a limited range in opposed directions longitudinally of the objective axis; driving means for the setting device; electrically operated remotely controlled means selectively operable to couple the driving means and the setting device to operate the setting in a selected direction within such range; a switch in circuit with said remotely controlled means; a switch operating element, movable in accordance with the position of said coupling member, by said setting device, and operatively associated with said switch; said element effecting closure of said switch whenever said coupling member is at other than substantially the midpoint of such range, and effecting opening of said switch when said coupling member is at such midpoint; and means operable, responsive to connection of the projector to a source of potential, to connect said switch to a source of potential, said last-named means being operable, responsive to commencement of operation of the projector, to disconnect said switch from its source of potential.

3. A slide projector as claimed in claim 2 in which said last-named means comprises a double throw switch which, when the projector is not projecting, occupies a position connecting said first-named switch to a source of potential and which is moved to a second position disconnecting said first-named switch from its source of potential upon placing of the projector in operation.

4. A slide projector as claimed in claim 3 in which said double throw switch, in its second position, connects the projection lamp to said source of potential and, in the first position, disconnects the projection lamp from said source of potential.

5. A slide projector as claimed in claim 4 in which said switch operating element is a circular cam having a peripheral recess; said first-named switch is a normally open switch having a spring biased arm engaging the periphery of said cam to maintain said first-named switch closed except when said spring biased arm is engaged in said peripheral recess; said peripheral recess being so located that said spring biased arm is engaged therein when said coupling member is at the midpoint of its range of movement.

6. A slide projector as claimed in claim 2 in which said setting device includes a pair of driving members rotatably mounted on a plate pivotally suspended in the projector, the rotatable driving members being connected through means, including a gear train, to said coupling member; said driving means comprising a rotatable shaft selectively engageable with either of said driving members; said plate having an armature portion disposed between a pair of opposed electromagnets constituting said remotely controlled means; a remote control switch selectively operable to energize either one of said electromagnets to swing said plate to engage a selected one of said driving members with said rotatable shaft to operate said coupling member to shift the objective mount longitudinally of the objective axis; said first-named switch being connected to one of said electromagnets in parallel with said remote control switch.

7. A slide projector is claimed in claim 6 in which said means operable to connect said first-named switch to a source of potential comprises a double throw switch which, when the projector is not projecting, occupies a position connecting said first-named switch to a source of potential and which is moved to a second position disconnecting said first-named switch from its source of potential, upon placing the projector in operation.

8. A slide projector as claimed in claim 7 in which said double throw switch, in its second position, connects the projection lamp to said source of potential and, in the first position, disconnects the projection lamp from said source of potential.

9. A slide projector as claimed in claim 2 in which said switch operating element is a circular cam having a peripheral recess; said switch being a normally open switch having a spring biased arm engaged with the periphery of said cam to maintain said switch closed except when said spring biased arm is engaged in said peripheral recess; said peripheral recess being so located that said spring biased arm is engaged therein when said coupling element is at substantially the midpoint of its range of movement.

References Cited in the file of this patent
FOREIGN PATENTS

| | | |
|---|---|---|
| 863,334 | Great Britain | Mar. 22, 1961 |
| 1,103,627 | Germany | Mar. 30, 1961 |